United States Patent [19]

MacPherson

[11] Patent Number: 5,742,453
[45] Date of Patent: Apr. 21, 1998

[54] PASSIVE NON-CONTACT MAGNETIC LATCH FOR AN ACTUATOR OF A DISK DRIVE

[75] Inventor: Aaron MacPherson, Fort Collins, Colo.

[73] Assignee: Maxtor Corporation, Longmont, Colo.

[21] Appl. No.: 420,451

[22] Filed: Apr. 10, 1995

Related U.S. Application Data

[63] Continuation of Ser. No. 237,729, May 4, 1994, abandoned, which is a continuation of Ser. No. 960,712, Oct. 14, 1992, abandoned.

[51] Int. Cl.⁶ .................................................. G11B 5/54
[52] U.S. Cl. ..................................................... 360/105
[58] Field of Search .......................... 360/105; 369/244, 369/257; 335/229–234

[56] References Cited

U.S. PATENT DOCUMENTS

| | | | |
|---|---|---|---|
| 4,746,886 | 5/1988 | Uetsuhara | 335/230 |
| 4,751,487 | 6/1988 | Green, Jr. | 335/234 |
| 5,003,422 | 3/1991 | Sun et al. | 360/105 |
| 5,023,736 | 6/1991 | Kelsic et al. | 360/105 |
| 5,034,837 | 7/1991 | Schmitz | 360/105 |
| 5,136,194 | 8/1992 | Oudet et al. | 360/105 |
| 5,170,300 | 12/1992 | Stefansky | 360/105 |
| 5,208,713 | 5/1993 | Lindsay et al. | 360/105 |

*Primary Examiner*—Stuart S. Levy
*Assistant Examiner*—George J. Letscher
*Attorney, Agent, or Firm*—Sheridan Ross P.C.

[57] ABSTRACT

A passive non-contact magnetic latch for latching read/write heads of a disk drive over a landing area of the disk is disclosed. The magnet latch forms a magnetic circuit for capturing a latch tab within an air gap. Magnetic flux lines traverse the latch tab in a direction substantially perpendicular to a direction of movement of the latch tab.

12 Claims, 4 Drawing Sheets

PASSIVE NON-CONTACT MAGNETIC LATCH FOR AN ACTUATOR OF A DISK DRIVE

This is a continuation of application(s) Ser. No. 08/237,729 filed on May 4, 1994, now abandoned, which is a continuation of Ser. No. 07/960,712 filed on Oct. 14, 1992, now abandoned.

FIELD OF THE INVENTION

The present invention pertains to the field of disk drives for mass storage of information in a computer system. More particularly, this invention relates to a passive non-contact magnetic latch for latching a read/write head actuator of a disk drive.

BACKGROUND OF THE INVENTION

In a typical disk drive, an area of each disk serves as a landing area for the read/write heads. A typical disk drive employs a latching mechanism to hold the read/write heads over the landing area during spin up, spin down, and power down of the disk drive. The landing area is a portion of the disk not used for data storage. Typically, the landing area corresponds to the disk tracks closest to the center of the disk.

The read/write heads are latched over the landing area while the disk spins up or down in order to prevent the read/write heads from damaging the areas of the disk where data is stored. The read/write heads are latched over the landing area while the disk drive is powered off in order to prevent the read/write heads from bouncing on the data areas of the disk and corrupting the stored data.

Latching of the read/write heads during power down is particularly important in portable computer systems that are subject to frequent movements. In portable computer systems, the latching mechanism holds the read/write heads over the landing area to prevent read/write head from bouncing out on to the data areas of the disk.

Referring to FIG. 1a, a prior art latching mechanism for the read/write heads of a disk drive is illustrated. The latching mechanism shown latches a latch tab 26 which is coupled to an actuator (not shown) for positioning the read/write heads of a disk drive. A pair of magnetically permeable pins 20 and 22 are placed against a magnet 24 having a north pole and a south pole. The latch tab 26 completes a magnetic circuit comprising the north pole of the magnet 24, the pin 22, the latch tab 26, the pin 20, and the south pole of the magnet 24. The arrow represents the direction of the magnetic flux generated by the magnet 24.

However, such a prior latching mechanism suffers from wide variation in latching force due to manufacturing tolerances. Manufacturing variation usually results in one of the pins 20 or 22 extending farther from the magnet 24 than the other. As a consequence, the pins 20 and 22 rarely both make contact with the latch tab 26, which causes an air gap in the magnetic circuit. The air gap reduces the latching force on the latch tab 26, and results in wide variation in latching force between disk drives.

FIG. 1b illustrates a latching mechanism disclosed by Stefansky (U.S. Pat. No. 5,025,335). A magnet 34 is shown coupled to a base 36 and a bumper 30. A latch tab 38 is coupled to an actuator (not shown) for the read/write heads of the disk drive. As shown by the arrows, the magnetic flux generated by the magnet 34 extends toward the latch tab 38. The magnetic lines of force extend in a direction parallel to the direction of movement of the latch tab 38.

However, such a prior art latch mechanism having magnetic flux lines parallel to the movement of the latch tab suffer from leakage of the magnetic flux. The flux leakage is directed toward the latch tab 38. The stray flux acts on the latch tab 38 while the read/heads are positioned outside the landing area. If the magnet 34 generates a strong magnetic field, the stray flux may interfere with positioning of the read/write heads over the data area of the disk. As a consequence, the magnet 34 must be relatively weak in order to minimize such interference. Unfortunately, a weaker magnet results in a weaker latching mechanism and a disk drive more susceptible to damage from head bouncing.

SUMMARY AND OBJECTS OF THE INVENTION

One object of the present invention is to latch the read/write heads of a disk drive over a landing area of the disk.

Another object of the present invention is to employ a magnetic latch to hold the read/write heads over the landing area of the disk, while minimizing latching force when the read/write heads are positioned outside the landing area of the disk.

Another object of the present invention is to employ a non contact magnetic latching mechanism to latch the read/write heads over the landing area of the disk, and minimize variation in latching force due to manufacturing tolerances.

A further object of the present invention is to employ a non contact magnetic latching mechanism to latch the read/write heads over the landing area of the disk, wherein the magnetic flux for capturing a latch tab extend perpendicular to the motion of the latch tab in order to minimize flux leakage.

These and other objects of the invention are provided by a passive non-contact magnetic latch. The present magnetic latch positions a read/write head of a disk drive over a landing area of the disk. The magnet latch forms a magnetic circuit for capturing a latch tab within an air gap. The latch tab is coupled to an actuator that positions the read/write heads. The magnetic circuit generates magnetic flux lines that traverse the latch tab in a direction substantially perpendicular to a direction of movement of the latch tab.

For one embodiment, the magnetic circuit comprises a pair of horizontally opposing magnets forming the air gap, and means for conducting the magnetic flux lines between the magnets.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A passive non-contact magnetic latch is disclosed for latching a read/write head of a disk drive over a landing area of the disk. The magnet latch forms a magnetic circuit for capturing a latch tab within an air gap in order to avoid latching force variation due to manufacturing tolerances. The magnetic circuit generates magnetic flux lines that traverse the latch tab in a direction substantially perpendicular to a direction of movement of the latch tab to reduce flux leakage that would otherwise interfere with positioning of the read/write heads over a data area of the disk.

Figure 1A:
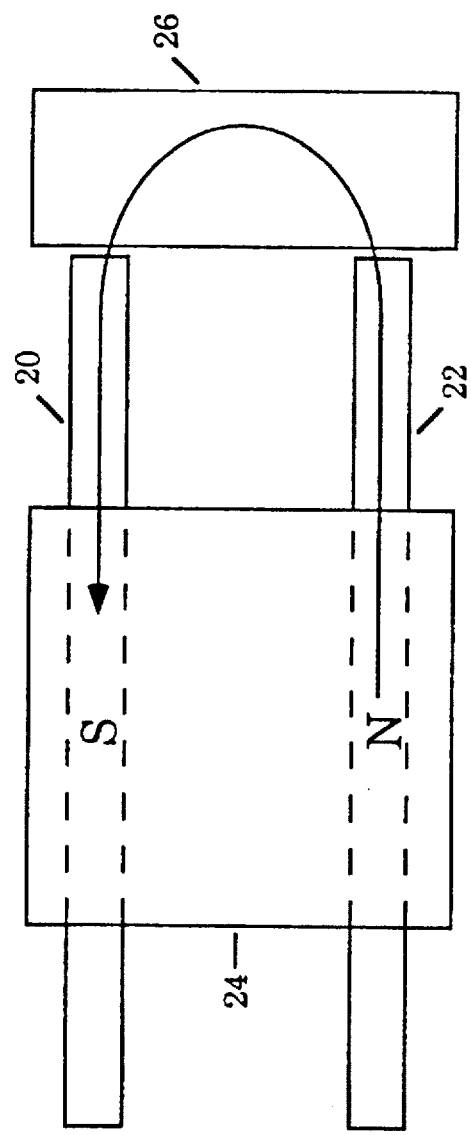
FIG. 1a and 1b illustrate prior magnetic latching mechanisms that suffer from manufacturing tolerance variation and magnetic flux leakage.
Figure 1B:
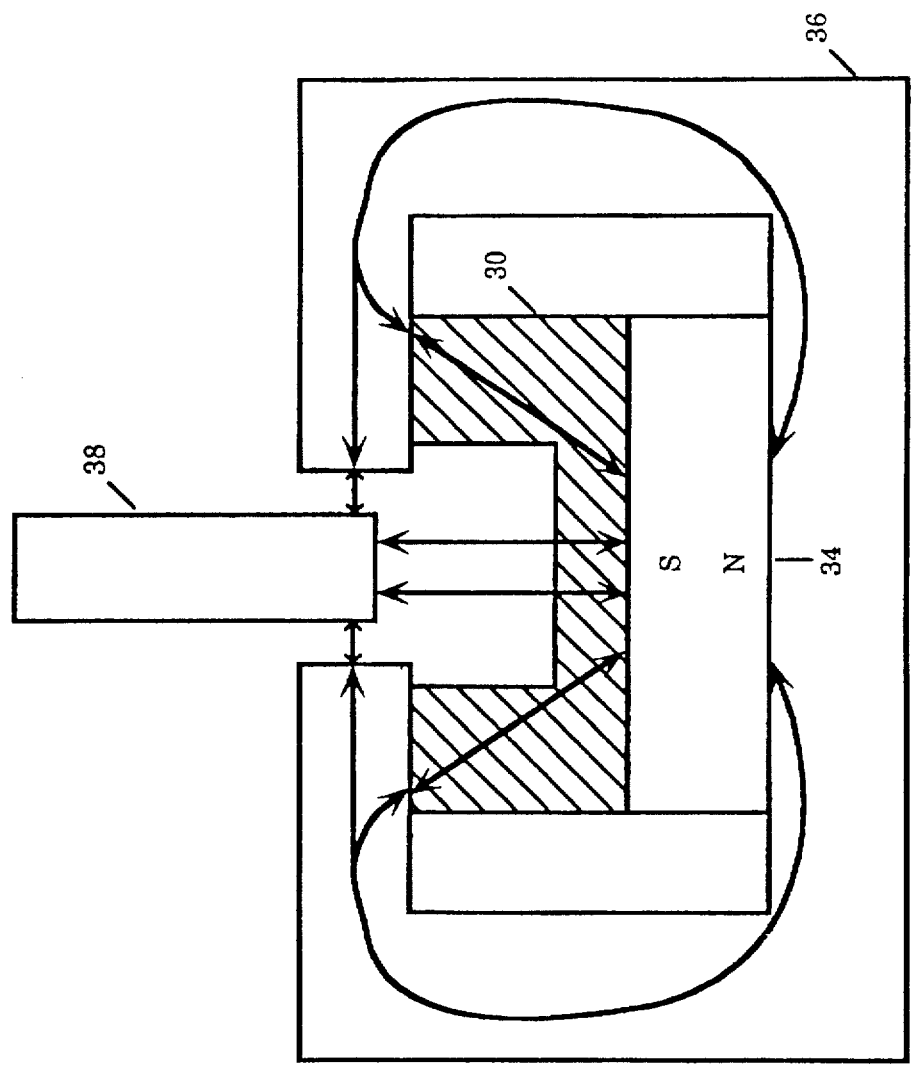
Figure 2:
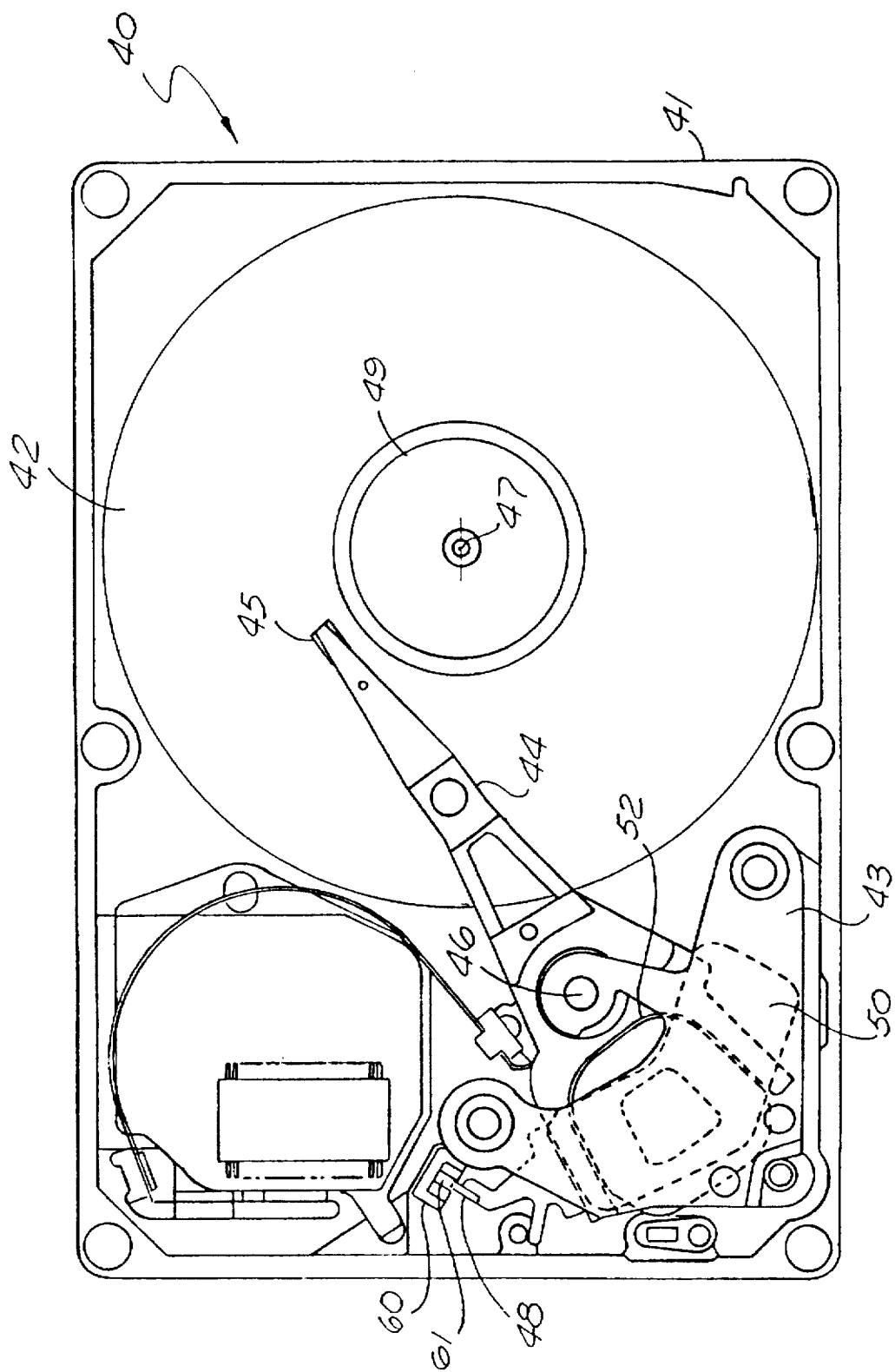
FIG. 2 illustrates a top view of a disk drive showing a disk, an actuator for controlling the position of the read/write heads, and the present magnetic latch.

FIG. 2 illustrates a top view of a disk drive 40. A disk 42 is shown disposed within a housing 41. The disk 42 represents one or more rotating disks for storing information for a computer system. The disk 42 revolves around a center point 47 under control of a motor 49. Information is stored on both sides of each disk of the disk 42. For one embodiment, the disk 42 stores information under the control of an externally generated magnetic field through a read/write head 45.

The read/write head 45 is shown coupled to an end of an actuator 44 and positioned over a landing area of the disk 42. The read write head 45 directs a magnetic field for storing information on the disk 42. The read/write head 45 represents the read/write heads corresponding to the storage surfaces for all disk surfaces of the disk 42. The actuator 44 rotates about an actuator pivot 46 under control of a voice coil motor 52 positioned between a pair of magnets 50. Movement of the actuator 44 about the actuator pivot 46 controls the radial position of the read/write head 45 over the disk 42.

Storage areas of the disk 42 are accessed by positioning the actuator 44 according to the desired disk track. An actuator control circuit (not shown) causes current flow in the voice coil motor 52. The voice coil motor 52 is immersed in a magnetic field generated by the magnets 50. The actuator control circuit controls the position of the actuator 44 by controlling the voice coil current.

The landing area of the disk 42 is allocated for take off and landing of the read/write head 45 during spin up and spin down of the disk 42. The read/write head 45 is parked over the landing area during spin up and after spin down of the disk 42. The read/write head 45 is also parked over the landing area to prevent damage to the data areas of the disk 42 during sudden movements of the disk drive 40.

A magnetic latch 60 is coupled to the housing 41. The magnetic latch 60 forms a magnetic circuit for generating a magnetic field within an air gap 61. A latch tab 48 is shown coupled to the actuator 44. As the actuator 44 moves the read/write head 45 toward the landing area of the disk 42, the latch tab 48 enters the air gap 61. The latch tab 48 comprises a magnetically permeable material which completes the magnetic circuit for the magnetic flux generated by the magnetic latch 60. When the magnetic circuit is complete, the latch tab 48 and the actuator 44 are held in position with the read/write head 45 positioned over the landing area of the disk 42.

Figure 3:
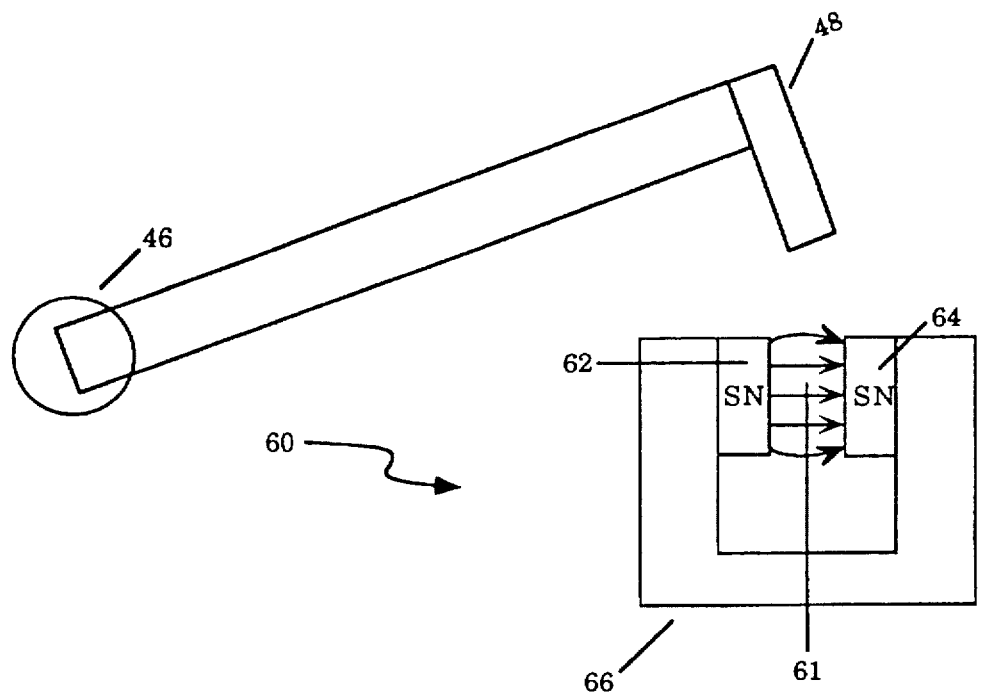
FIG. 3 illustrates the present magnetic latch when the actuator is positioned to extend the read/write head over a data area of the disk.
Figure 4:
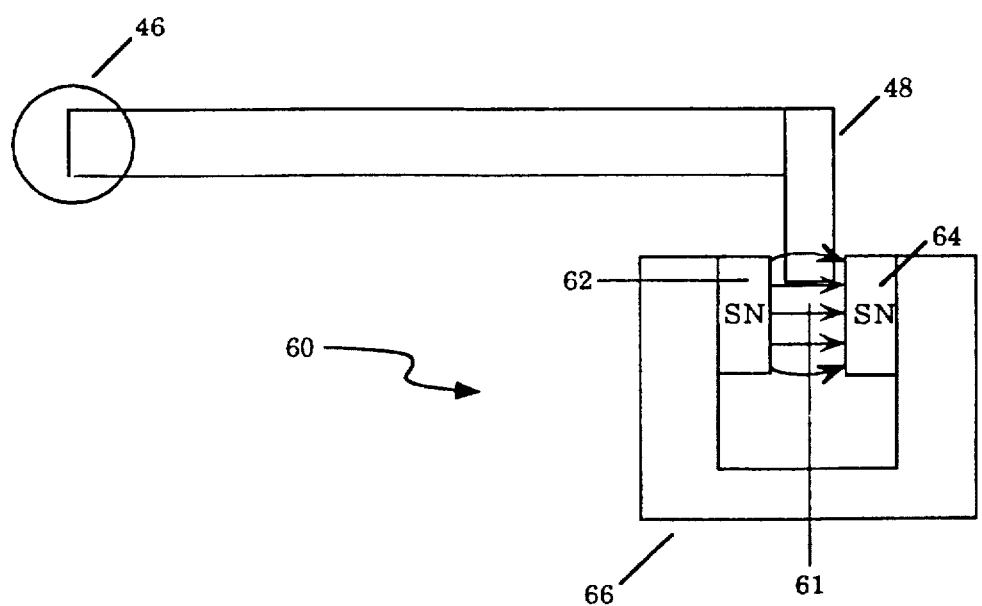
FIG. 4 illustrates the magnetic latch when the actuator is positioned to extend the read/write head over the landing area of the disk.

FIGS. 3 and 4 illustrate the operation of the magnetic latch 60. A U-shaped member 66 is coupled to the housing 41. The U-shaped member 66 comprises magnetically permeable material. A pair of magnets 62 and 64 are coupled to the U-shaped member 66 to form the air gap 61. The air gap 61 is formed between the north pole of the magnet 62 and the south pole of the magnet 64. Also shown are positions for the actuator 44 and the latch tab 48.

FIG. 3 illustrates the magnetic latch 60 when the actuator 44 is positioned to extend the read/write head 45 over a data area of the disk 42. The data area of the disk 42 is located between the landing area and the outer diameter of the disk 42. Also shown are the flux lines corresponding to the magnetic field in the air gap 61. The magnetic field in the air gap 61 drops off rapidly in the direction of the latch tab 48 because the magnetic flux is directed between the magnets 62 and 64. The magnetic flux traverses the air gap 61 perpendicular to the direction of motion of the latch tab 48, thereby reducing stray flux in the direction of the latch tab 48.

FIG. 4 illustrates the magnetic latch 60 when the actuator 44 is positioned to extend the read/write head 45 over the landing area of the disk 42. Also shown are the flux lines corresponding to the magnetic field in the air gap 61. The latch tab 48 completes the magnetic circuit for the flux generated by the magnetic latch 60 to hold the read/write head 45 over the landing area of the disk 42.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for latching an actuator that positions a read/write head of a disk drive, comprising:

a latch arm rotatably coupled to an actuator pivot for the actuator, the latch arm rotating about the actuator pivot as the read/write head moves radially across a disk;

a latch tab coupled to the latch arm, the latch tab having a direction of movement, the latch tab for moving in the direction of movement in response to the latch arm rotating about the actuator pivot;

a U-shaped member coupled to a housing of the disk drive, the U-shaped member for conducting magnetic flux, the U-shaped member including a base, a first arm coupled to the base, and a second arm coupled to the base, the first and second arms extending outwardly from the base in a direction substantially parallel to the direction of movement of the latch tab;

a first magnet having a north pole and a south pole, the south pole of the first magnet being connected to the first arm such that the north pole of the first magnet faces the second arm;

a second magnet having a north pole and a south pole, the north pole of the second magnet being connected to the second arm such that the south pole of the second magnet faces the north pole of the first magnet forming an air gap therebetween wherein the first and second magnets generate a magnetic field across the air gap, substantially all magnetic flux lines of the magnetic field traversing the air gap substantially straight between the facing poles and substantially perpendicular to the direction of movement of the latch tab to minimize magnetic flux outside of said first and second arms.

2. The apparatus of claim 1, wherein the latch tab enters the air gap when the read/write head is positioned over a landing area of the disk.

3. An apparatus for latching an actuator that positions a read/write head of a disk drive, the actuator including a latch arm rotatably coupled to an actuator pivot, a latch tab coupled to the latch arm, the latch tab having a direction of movement, the latch tab for moving in the direction of movement in response to the latch arm rotating about the actuator pivot, the apparatus for latching comprising:

a latch receiving member having a base and two arms separated by an air gap;

a magnetic circuit associated with the latch receiving member, the magnetic circuit including a magnet disposed on the end of said two arms generating a magnetic field across said air gap so as to minimize stray flux outside of said air gap, magnetic flux lines of the magnetic field within the air gap traversing straight across said gap and traversing said latch tab when said tab is in said gap, in a direction substantially perpendicular to the direction of movement of the latch tab; and means for coupling the magnetic circuit to a housing of the disk drive.

4. The apparatus of claim 3, wherein the magnetic circuit comprises:

a first magnet having a north pole and a south pole; and a second magnet having a north pole and a south pole, the second magnet being positioned such that the south pole of the second magnet faces the north pole of the first magnet and the air gap is formed between the south pole of the second magnet and the north pole of the first magnet.

5. The apparatus of claim 3, wherein the magnetic circuit comprises:

a U-shaped member coupled to a housing of the disk drive, the U-shaped member for conducting magnetic flux, the U-shaped member including a base, a first arm coupled to the base, and a second arm coupled to the base, the first and second arms extending outwardly from the base towards the actuator in a direction substantially parallel to the direction of movement of the latch tab;

a first magnet having a north pole and a south pole, the south pole of the first magnet being connected to the first arm such that the north pole of the first magnet faces the second arm;

a second magnet having a north pole and a south pole, the north pole of the second magnet being connected to the second arm such that the south pole of the second magnet faces the north pole of the first magnet, wherein the air gap is formed between the north pole of the first magnet and the south pole of the second magnet and stray magnetic flux outside of said first and second arms is minimized.

6. The apparatus of claim 3, wherein the latch tab enters the air gap when the read/write head is positioned over a landing area of a disk.

7. A method for latching an actuator that positions a read/write head of a disk drive, the method comprising the steps of:

providing a latch tab rotatably coupled to an actuator pivot for movement in unison with an actuator;

providing a latch receiving member having a base and two arms separated by an air gap, and a magnet disposed on the end of each of said two arms;

generating a magnetic field across said air gap so as to minimize stray flux outside said air gap such that substantially all magnetic flux lines of the magnetic field within the air gap traverse said gap in a direction substantially perpendicular to a direction of movement of a latch tab; and positioning the latch tab in the magnetic field in the air gap.

8. An apparatus for latching an actuator that positions a read/write head of a disk drive, comprising:

a latch arm rotatably coupled to an actuator pivot for the actuator, the latch arm rotating about the actuator pivot as the read/write head moves radially across a disk;

a latch tab coupled to the latch arm in response to the latch arm rotating about the actuator pivot;

a U-shaped member for conducting magnetic flux coupled to a housing of the disk drive, the U-shaped member including a base, a first arm coupled to the base, and a second arm coupled to the base, the first and second arms extending outwardly from the base in a direction substantially parallel to the direction of movement of the latch tab;

a first magnet having a north pole and a south pole, the south pole of the first magnet being connected to the first arm such that the north pole of the first magnet faces the second arm;

a second magnet having a north pole and a south pole, the north pole of the second magnet being connected to the second arm such that the south pole of the second magnet faces the north pole of the first magnet forming an air gap therebetween wherein the first and second magnets generate a magnetic field across the air gap in a direction to minimize stray flux outside said first and second arms such that substantially all magnetic flux lines of the magnetic field traversing the air gap are substantially perpendicular to the direction of the movement of the latch tab and such that substantially all magnetic flux lines outside of the air gap that intersect the latch tab will intersect the latch tab in the direction substantially perpendicular to the direction of movement of the latch tab.

9. The apparatus of claim 8, wherein the latch tab enters the air gap when the read/write head is positioned over a landing area of the disk.

10. An apparatus for latching an actuator that positions a read/write head of a disk drive, the actuator including a latch arm having a latch tab and rotatably coupled to an actuator pivot, the latch tab having a direction of movement in response to the latch arm rotating about the actuator pivot, the apparatus for latching comprising:

a latch receiving member including a base member having a pair of spaced arms with magnets disposed on the end of each arm and defining an air gap therebetween;

a magnetic circuit associated with said latch receiving member for generating a magnetic field across said air gap and minimizing stray flux outside said air gap, substantially all magnetic flux lines of the magnetic field within said air gap traversing straight across the air gap in a direction substantially perpendicular to the direction of movement of the latch tab.

11. The apparatus of claim 10, wherein the magnetic circuit comprises:

a first magnet having a north pole and a south pole; and a second magnet having a north pole and a south pole, the second magnet being positioned such that the south pole of the second magnet faces the north pole of the first magnet and the air gap is formed between the south pole of the second magnet and the north pole of the first magnet.

12. A method for latching a latch tab on a latch arm of an actuator that positions a read/write head of a disk drive, the method comprising the steps of:

generating a magnetic field across an air gap utilizing a U-shaped member for conducting magnetic flux in a direction to minimize stray flux outside the air gap defined by the opposed legs of the U-shaped member such that substantially all magnetic flux lines of the magnetic field within the air gap traverse across the air gap substantially perpendicular to the direction of movement of the latch tab, and positioning the latch tab in the magnetic field by rotating the latch arm about an actuator pivot as the read/write head moves radially across a disk such that the latch tab which is coupled to the latch arm enters the air gap.

* * * * *

UNITED STATES PATENT AND TRADEMARK OFFICE
CERTIFICATE OF CORRECTION

PATENT NO. : 5,742,453
DATED : April 21, 1998
INVENTOR(S) : MacPherson

It is certified that error appears in the above-identified patent and that said Letters Patent is hereby corrected as shown below:

In Claim 3 at column 5, line 7, after "end of", insert -- each of --.

Signed and Sealed this

Fourteenth Day of July, 1998

Attest:

BRUCE LEHMAN

*Attesting Officer*    *Commissioner of Patents and Trademarks*